US012738211B2

(12) United States Patent
Chu et al.

(10) Patent No.: US 12,738,211 B2
(45) Date of Patent: Sep. 15, 2026

(54) IMAGE DATA PROCESSING APPARATUS AND METHOD, AND DISPLAY PANEL

(71) Applicant: BOE Technology Group Co., Ltd., Beijing (CN)

(72) Inventors: Mingi Chu, Beijing (CN); Zhiqiang Dong, Beijing (CN); Tianji Li, Beijing (CN); Huiwen Ma, Beijing (CN); Ying Han, Beijing (CN); Lirong Wang, Beijing (CN); Song Meng, Beijing (CN); Chen Xu, Beijing (CN); Dandan Zhou, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 19/146,497

(22) PCT Filed: Jun. 12, 2024

(86) PCT No.: PCT/CN2024/098574

§ 371 (c)(1),
(2) Date: Jul. 8, 2025

(87) PCT Pub. No.: WO2025/025832

PCT Pub. Date: Feb. 6, 2025

(65) Prior Publication Data

US 2026/0221085 A1 Jul. 30, 2026

(30) Foreign Application Priority Data

Jul. 28, 2023 (CN) ......................... 202310945045.5

(51) Int. Cl.
*G09G 3/3208* (2016.01)

(52) U.S. Cl.
CPC ... *G09G 3/3208* (2013.01); *G09G 2320/0233* (2013.01); *G09G 2320/0257* (2013.01); *G09G 2320/0626* (2013.01); *G09G 2360/16* (2013.01)

(58) Field of Classification Search
CPC ......... G09G 3/3208; G09G 2320/0257; G09G 2360/16; G09G 2320/0626; G09G 2320/0233
See application file for complete search history.

(56) References Cited

U.S. PATENT DOCUMENTS

2012/0320107 A1 12/2012 Murakami et al.
2015/0348467 A1* 12/2015 Gyu ..................... G09G 3/3406 345/690

(Continued)

FOREIGN PATENT DOCUMENTS

CN 105551425 A 5/2016
CN 107731159 A 2/2018

(Continued)

*Primary Examiner* — Muhammad N Edun
(74) *Attorney, Agent, or Firm* — IPro, PLLC

(57) ABSTRACT

An image data processing apparatus includes a calculation unit configured to calculate an average picture level of an $n^{th}$ frame image based on received $n^{th}$ frame image data; an acquisition unit configured to, in response to that a difference between the average picture level of the $n^{th}$ frame image and an average picture level of an $(n-1)^{th}$ frame image≤a first threshold, acquire an average picture level of each frame of moving image obtained after the $(n-1)^{th}$ frame image is moved in multiple preset moving directions; an adjustment unit configured to, in response to that the average picture level of the $n^{th}$ frame image is equal to the average picture level of any frame of moving image, acquire an accumulated display time length of image content displayed by the $n^{th}$ frame image, and adjust brightness of the $n^{th}$ frame image according to the accumulated display time length.

20 Claims, 5 Drawing Sheets

(56) References Cited

U.S. PATENT DOCUMENTS

| | | | | |
|---|---|---|---|---|
| 2020/0193891 | A1* | 6/2020 | Sun | G09G 5/363 |
| 2021/0043162 | A1* | 2/2021 | Henderson | H04N 23/70 |
| 2021/0065653 | A1* | 3/2021 | Keith | G09G 5/10 |

FOREIGN PATENT DOCUMENTS

| | | | |
|---|---|---|---|
| CN | 108538260 | A | 9/2018 |
| CN | 110363209 | A | 10/2019 |
| CN | 115244609 | A | 10/2022 |
| CN | 116913211 | A | 10/2023 |

* cited by examiner

IMAGE DATA PROCESSING APPARATUS AND METHOD, AND DISPLAY PANEL

CROSS-REFERENCE TO RELATED APPLICATION

This is a National Phase Application filed under 35 U.S.C. 371 as a national stage of PCT/CN2024/098574, filed on Jun. 12, 2024, an application claiming the benefit of Chinese Application No. 202310945045.5 filed on Jul. 28, 2023, the content of each of which is hereby incorporated by reference in its entirety.

TECHNICAL FIELD

The present disclosure relates to the technical field of image processing, and specifically relates to an image data processing apparatus and method, and a display panel.

BACKGROUND

As an amperometric light-emitting device, more and more electroluminescent elements have been applied to display panels. Due to a self-luminous property of the electroluminescent element, an electroluminescent display panel does not need a backlight, and has the advantages of high contrast, thinness, wide viewing angle, fast response, flexibility, simple structure and easy manufacturing and the like, and therefore has gradually become a next generation mainstream display panel. Generally, a pixel circuit of a display panel includes a display unit, a thin film transistor (TFT), and a storage capacitance, where the display unit may be a liquid crystal display (LCD), an organic electroluminescence display (OLED), or any other display unit. The pixel circuit charges a voltage corresponding to display data to the capacitance by switching on/off the TFT with a fixed scanning waveform, controls the display unit by controlling a magnitude of the voltage, and further adjusts brightness of the display unit.

To avoid a residual image on an OLED due to the same image displayed for a long time, a common practice is to adopt an image movement scheme, in which a position of the image is moved at fixed time to prevent the OLED from lighting with the same brightness for a long time. However, although image movement can prevent pixels from displaying the same brightness for a long time, the problem of residual image may still occur for a high brightness picture, and therefore, a static image brightness reduction algorithm is usually added. However, since the image movement may cause a change in the display image and conflict with a discrimination method for a static image, even if the display image remains the same, it will be determined as non-static image display due to the regular image movement, and finally make it impossible to implement the static image brightness reduction algorithm.

SUMMARY

To solve at least one of the technical problems in the existing art, the present disclosure provides an image data processing apparatus and method and a display panel which can effectively combine image movement and a static image brightness reduction scheme, and avoid abnormal brightness reduction caused by some use scenarios or pictures.

In a first aspect, a technical solution adopted to solve the technical problem of the present disclosure is an image data processing apparatus, including:

a calculation unit configured to calculate an average picture level of an $n^{th}$ frame image based on received $n^{th}$ frame image data;

an acquisition unit configured to, in response to that a difference between the average picture level of the $n^{th}$ frame image and an average picture level of an $(n-1)^{th}$ frame image is smaller than or equal to a first threshold, acquire an average picture level of each frame of moving image obtained after the $(n-1)^{th}$ frame image is moved in a plurality of preset moving directions;

an adjustment unit configured to, in response to that the average picture level of the $n^{th}$ frame image is equal to the average picture level of any frame of moving image, acquire an accumulated display time length of image content displayed by the $n^{th}$ frame image, and adjust brightness of the $n^{th}$ frame image according to the accumulated display time length.

In some embodiments, the apparatus further includes:

a control unit configured to, in response to that the average picture level of the $n^{th}$ frame image is not equal to the average picture level of any frame of moving image, output the $n^{th}$ frame image data for display, reset the accumulated display time length of the image content displayed by the $n^{th}$ frame image to zero, and restart timing.

In some embodiments, the apparatus further includes:

a determination unit configured to determine an image discrimination region based on maximum numbers of pixels that the $(n-1)^{th}$ frame image has moved in a horizontal direction and a vertical direction relative to each moving image of the $(n-1)^{th}$ frame image;

wherein the calculation unit is further configured to determine the average picture level of any frame image according to a brightness value of each subpixel in the image discrimination region.

In some embodiments, the calculation unit is further configured to determine the average picture level of any frame image according to a brightness value of each subpixel in a display panel; wherein for the average picture level of the moving image, the determination unit is further configured to determine, according to a moving direction, a pixel vacancy region of the display panel relative to the moving image, and take a preset brightness value as the brightness value of each subpixel in the pixel vacancy region; and the calculation unit is configured to calculate an average picture level of the moving image based on a current brightness value of each subpixel in the display panel.

In some embodiments, the calculation unit is specifically configured to calculate the average picture level of any frame image according to an average picture level equation:

the average picture level=(Lr_sum+Lg_sum+Lb_sum+Lw_sum)/(Factor×Lmax_sum), wherein Lr_sum is a sum of red subpixels in a region to be calculated, Lg_sum is a sum of green subpixels in the region to be calculated, Lb_sum is a sum of blue subpixels in the region to be calculated, Lw_sum is a sum of white subpixels in the region to be calculated, Lmax_sum is a sum of all subpixels when the region to be calculated is fully bright, and Factor is a power consumption parameter, wherein the region to be calculated is the image discrimination region or an entire region of the display panel.

In some embodiments, the determination unit is specifically configured to determine the image discrimination region according to a horizontal resolution and a vertical resolution of the $(n-1)^{th}$ frame image, wherein a horizontal resolution of the image discrimination region=the horizontal resolution of the $(n-1)^{th}$ frame image-2*M; and a vertical resolution of the image discrimination region=the vertical resolution of the $(n-1)^{th}$ frame image-2*N; where M is a maximum number of pixels of the moving image moving in the horizontal direction, and N is a maximum number of pixels of the moving image moving in the vertical direction.

In some embodiments, the adjustment unit is specifically configured to judge whether the accumulated display time length is greater than or equal to a preset time length, if the accumulated display time length is greater than or equal to the preset time length, the adjustment unit is further configured to adjust brightness of the $n^{th}$ frame image based on a brightness reduction curve.

In some embodiments, the brightness reduction curve is a linear function curve.

In some embodiments, the adjustment unit is specifically configured to adjust the brightness of the $n^{th}$ frame image to 60% of original brightness of the $n^{th}$ frame image based on the brightness reduction curve.

In some embodiments, the acquisition unit is further configured to acquire $(n-1)^{th}$ frame image data; and the calculation unit is configured to calculate, based on the $(n-1)^{th}$ frame image data, the average picture level of each frame of moving image obtained after the $(n-1)^{th}$ frame image is moved in the plurality of preset moving directions.

In some embodiments, the determination unit is further configured to determine the plurality of preset moving directions of the $(n-1)^{th}$ frame image based on a moving mode of the $(n-1)^{th}$ frame image, and when the moving mode of the $(n-1)^{th}$ frame image is rectangular image movement or diamond-shaped image movement, the determination unit is configured to determine eight preset moving directions as the plurality of preset moving directions.

In some embodiments, the apparatus further includes a storage unit configured to store the average picture level of the $n^{th}$ frame image, and an average picture level of each frame of moving image obtained after the $(n-1)^{th}$ frame image is moved in a plurality of preset moving directions.

In a second aspect, an embodiment of the present disclosure provides an image data processing method, including:

calculating an average picture level of an $n^{th}$ frame image based on received $n^{th}$ frame image data;

in response to that a difference between the average picture level of the $n^{th}$ frame image and an average picture level of an $(n-1)^{th}$ frame image is smaller than or equal to a first threshold, acquiring an average picture level of each frame of moving image obtained after the $(n-1)^{th}$ frame image is moved in a plurality of preset moving directions; and in response to that the average picture level of the $n^{th}$ frame image is equal to the average picture level of any frame of moving image, acquiring an accumulated display time length of image content displayed by the $n^{th}$ frame image, and adjusting brightness of the $n^{th}$ frame image according to the accumulated display time length.

In some embodiments, the method further includes:

in response to that the average picture level of the $n^{th}$ frame image is not equal to the average picture level of any frame of moving image, outputting the $n^{th}$ frame image data for display, resetting the accumulated display time length of the image content displayed by the $n^{th}$ frame image to zero, and restarting timing.

In some embodiments, before calculating the average picture level of the $n^{th}$ frame image based on the received $n^{th}$ frame image data, the method further includes:

determining an image discrimination region based on maximum numbers of pixels that the $(n-1)^{th}$ frame image has moved in a horizontal direction and a vertical direction relative to each moving image of the $(n-1)^{th}$ frame image;

wherein the average picture level of any frame image is determined according to a brightness value of each subpixel in the image discrimination region.

In some embodiments, the average picture level of any frame image is determined according to a brightness value of each subpixel in a display panel; wherein calculating the average picture level of the moving image includes:

determining, according to a moving direction, a pixel vacancy region of the display panel relative to the moving image, and taking a preset brightness value as the brightness value of each subpixel in the pixel vacancy region; and calculating an average picture level of the moving image based on a current brightness value of each subpixel in the display panel.

In some embodiments, the average picture level of any frame image is calculated by:

the average picture level=(Lr_sum+Lg_sum+Lb_sum+Lw_sum)/(Factor×Lmax_sum), wherein Lr_sum is a sum of red subpixels in a region to be calculated, Lg_sum is a sum of green subpixels in the region to be calculated, Lb_sum is a sum of blue subpixels in the region to be calculated, Lw_sum is a sum of white subpixels in the region to be calculated, Lmax_sum is a sum of all subpixels when the region to be calculated is fully bright, and Factor is a power consumption parameter, wherein the region to be calculated is the image discrimination region or an entire region of the display panel.

In some embodiments, determining the image discrimination region based on the maximum numbers of pixels that the $(n-1)^{th}$ frame image has moved in the horizontal direction and the vertical direction relative to each moving image of the $(n-1)^{th}$ frame image includes:

a horizontal resolution of the image discrimination region=the horizontal resolution of the $(n-1)^{th}$ frame image-2*M; and a vertical resolution of the image discrimination region=the vertical resolution of the $(n-1)^{th}$ frame image-2*N; where M is a maximum number of pixels of the moving image moving in the horizontal direction, and N is a maximum number of pixels of the moving image moving in the vertical direction.

In a third aspect, an embodiment of the present disclosure provides a display panel, including any image data processing apparatus according to the first aspect.

DETAIL DESCRIPTION OF EMBODIMENTS

To improve understanding of the technical solution of the present invention/utility model for those skilled in the art, the present invention/utility model will be described in detail with reference to accompanying drawings and specific implementations.

Unless otherwise defined, technical or scientific terms used in the present disclosure are intended to have general meanings as understood by those of ordinary skill in the art to which the present disclosure belongs. The words "first", "second" and similar terms used in the present disclosure do not denote any order, quantity, or importance, but are used merely for distinguishing different components from each other. Likewise, the words "a", "an", or "the" and similar referents do not denote a limitation of quantity, but rather denote the presence of at least one. The word "comprise" or "include" or the like means that the element or item preceding the word contains elements or items that appear after the word or equivalents thereof, but does not exclude other elements or items. The terms "connected" or "coupled" and the like are not restricted to physical or mechanical connection, but may include electrical connection, either direct or indirect. The words "upper", "lower", "left", "right", or the like are merely used to indicate a relative positional relationship, and when an absolute position of the described object is changed, the relative positional relationship may be changed accordingly.

The residual image, also called image sticking, is a phenomenon that a previous picture is left on the display after the display content is changed because the display has displayed the same static picture for a long time, and the actual residual image may occur on the entire display screen or a local part of the display screen.

To avoid a residual image on an OLED due to the same image displayed for a long time, a common practice is to adopt an image movement scheme, in which a position of the image is moved at fixed time to prevent the OLED from lighting with the same brightness for a long time. However, although image movement can prevent pixels from displaying the same brightness for a long time, the problem of residual image may still occur for a high brightness picture, and in this case, a static image brightness reduction algorithm is usually added to reduce brightness of the image. It should be noted that the static image brightness reduction algorithm is applicable to a static image only. Whether an image is static or dynamic may be determined according to average picture levels (APLs) of different frame images. If two frame images have the same average picture level, the image is a static image, and if two frame images have different average picture levels, the image is a dynamic image. The dynamic image refers to an image with changing image content displayed.

Figure 1:
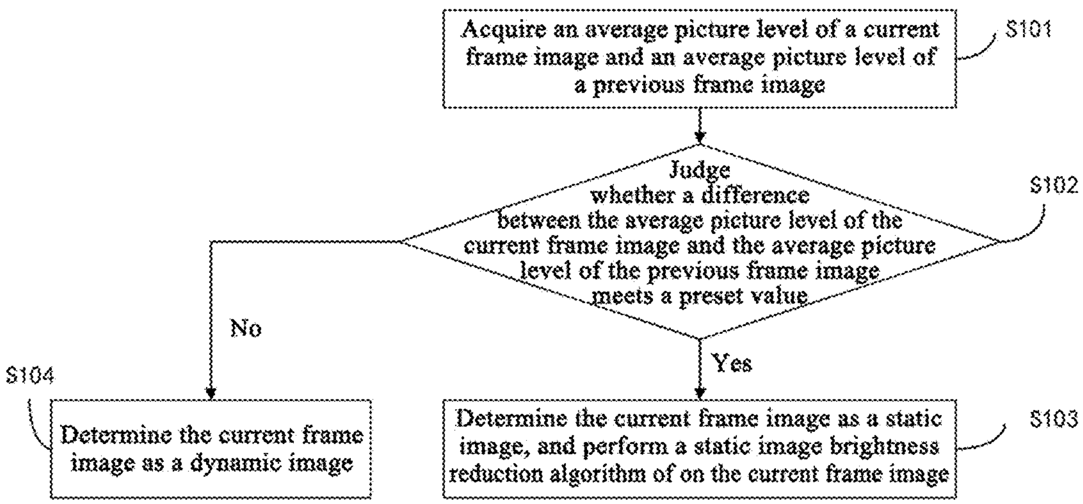
FIG. 1 is a flowchart of image data processing in the existing art.

However, when the image is only moved without changing the image content, the average picture level of a current frame image will also be changed from the average picture level of a previous frame image, making it impossible to determine the image as a static image. In the existing art, to effectively perform a static image brightness reduction algorithm and reserve the benefits of the image movement algorithm, a threshold is generally set for an average picture level difference between two frame images to avoid failing to identify a static image due to movement of the image. FIG. 1 is a flowchart of image data processing in the existing art. As shown in FIG. 1, the image data processing includes the following steps S101 to S104.

At S101: acquiring an average picture level of a current frame image and an average picture level of a previous frame image.

At S102: judging whether a difference between the average picture level of the current frame image and the average picture level of the previous frame image meets a preset value; performing S103 if the difference between the average picture level of the current frame image and the average picture level of the previous frame image meets the preset value, and performing S104 the difference between the average picture level of the current frame image and the average picture level of the previous frame image does not meet the preset value.

At S103: determining the current frame image as a static image, and performing a static image brightness reduction algorithm on the current frame image.

At S104: determining the current frame image as a dynamic image.

Specifically, when the average picture level of the current frame image is equal to the average picture level of the previous frame image, it indicates that the image content is not changed, and therefore, the static image brightness reduction algorithm can be directly performed on the current frame image. However, when the average picture level of the current frame image is not equal to the average picture level of the previous frame image, on one hand, this may be caused by a change in the image content of the current frame image, and in this case, the static image brightness reduction algorithm cannot be applied since the current frame image is a dynamic image. On the other hand, this may be caused by movement of the current frame image relative to the previous frame image, and in this case, static image brightness reduction can be performed on the current frame image according to the static image brightness reduction algorithm since the image content of the current frame image is not changed and the current frame image is still a static image. In the existing art, a preset value is set to characterize changes in the average picture level of an image due to image movement. If the difference in the average brightness value of the two frame images is within a preset value range, the change in the average brightness value is considered to be caused by image movement, and therefore, the image is a static image; otherwise, the change in the average brightness is considered to be caused by a change in the image content, and therefore, the image is a dynamic image.

Figure 2A:
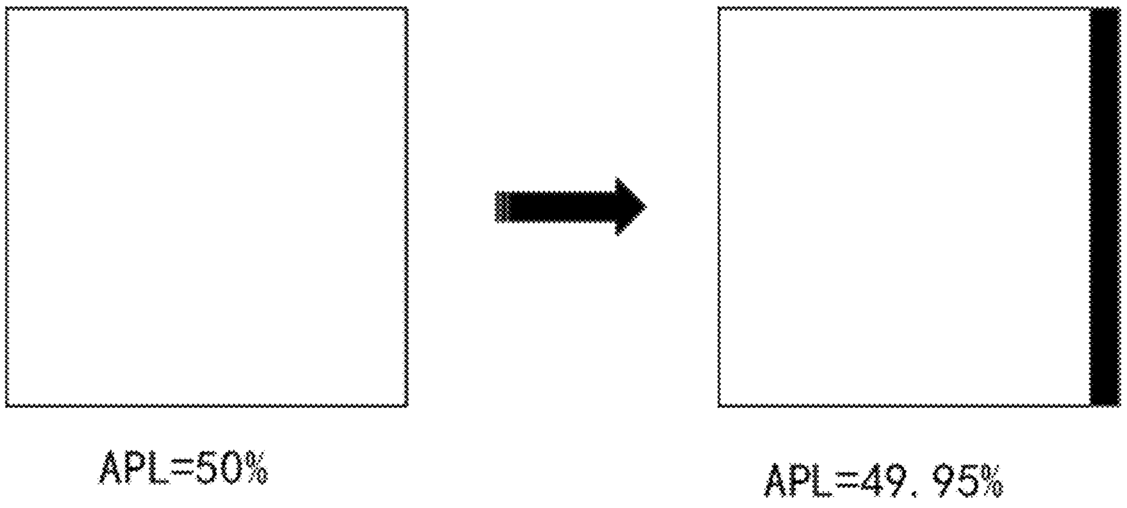
FIG. 2A is a diagram illustrating a comparison of average picture level values before and after image movement.

In some embodiments, the preset value may be set on a case-by-case basis. FIG. 2A is a diagram illustrating a comparison of average picture level values before and after image movement. Assuming that the preset value is set to 0.19%, as shown in FIG. 2A, the average picture level values APL before and after image movement are 50% and 49.95%, respectively, with a difference within 0.19%. Therefore, the current frame image is a static image.

Figure 2B:
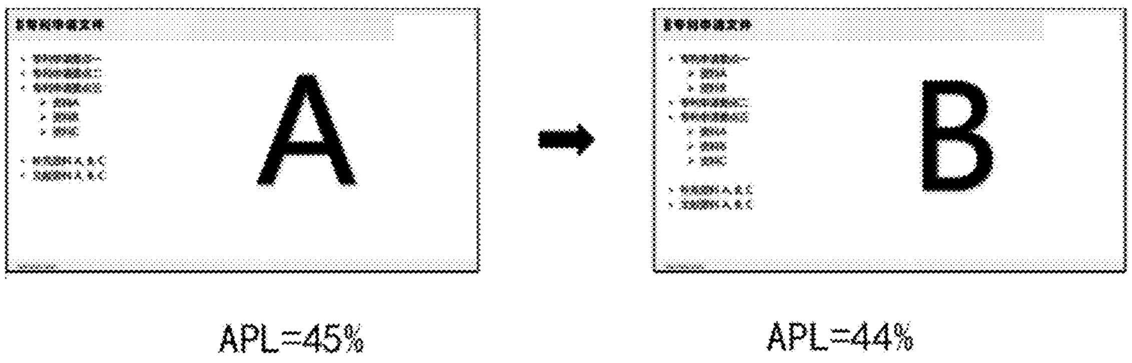
FIG. 2B is a diagram illustrating a comparison of average picture level values of different presentation documents.
Figure 2C:
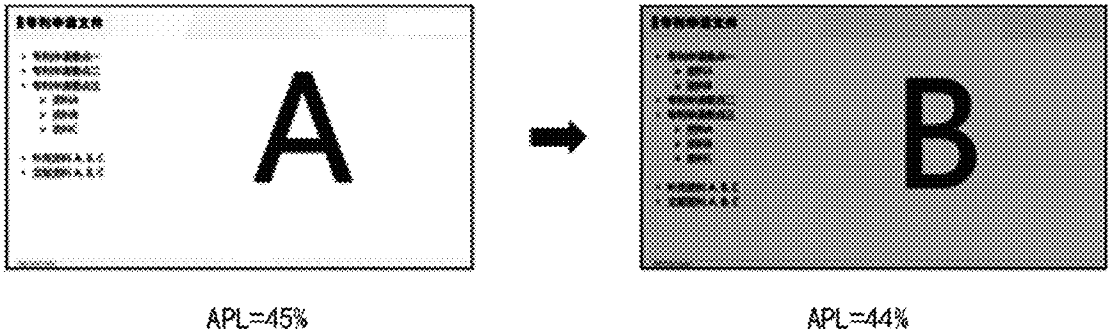
FIG. 2C is a diagram illustrating a brightness drop caused by picture switching.

Although the problem caused by image movement can be avoided by setting the preset value, the scheme tends to cause mistakes in application scenes with small image variations, such as office presentations, documents or pictures with similar formats, where due to highly similar contents, the average picture level values are also similar, and as a result, it is still regarded as a static image although the image content is changed. Still taking the preset value of 0.19% as an example, FIG. 2B is a diagram illustrating a comparison of average picture level values of different presentation documents, and FIG. 2C is a diagram illustrating a brightness drop caused by picture switching. As shown in FIG. 2B below, since the average picture level values of the current and previous frame images are close and within the preset value range, it is still regarded as a static image although the image content is changed, and brightness reduction is performed on the image. As shown in FIG. 2C, the brightness is perceived to be continuously decreased during use, which may affect the use experience of the user.

Figure 3:
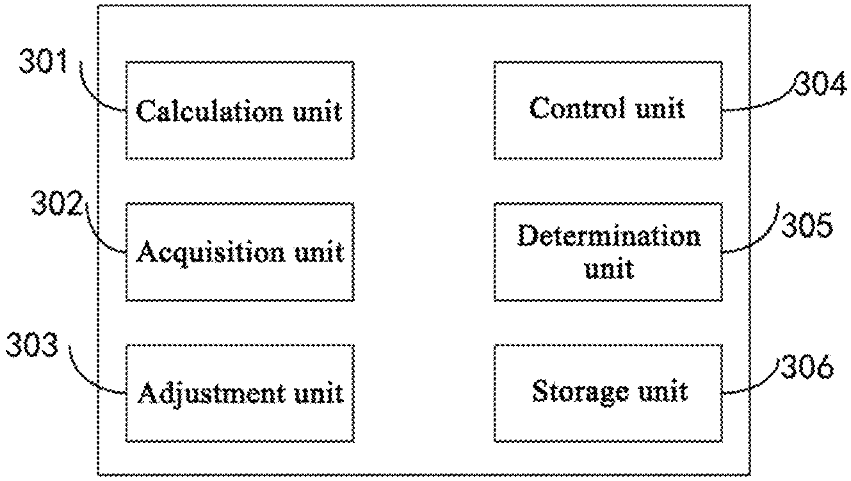
FIG. 3 is a structural diagram of an image data processing apparatus according to an embodiment of the present disclosure.

To solve the problem in the existing art, as shown FIG. 3, where a structural diagram of an image data processing apparatus according to an embodiment of the present disclosure is shown, the image data processing apparatus is configured to process the image data before the image is displayed, so as to avoid a residual image on an OLED due to the same image displayed for a long time. The image processing apparatus includes a calculation unit 301, an acquisition unit 302, and an adjustment unit 303.

The calculation unit 301 is configured to calculate an average picture level of an $n^{th}$ frame image based on received $n^{th}$ frame image data. Specifically, upon receiving an $n^{th}$ frame image data, the calculation unit 301 first calculates an average picture level of the $n^{th}$ frame image, and then judges whether image content of the $n^{th}$ frame image is changed relative to an $(n-1)^{th}$ frame image according to the average picture level of the $n^{th}$ frame image.

The acquisition unit 302 is configured to, in response to that a difference between the average picture level of the $n^{th}$ frame image and an average picture level of an $(n-1)^{th}$ frame image is smaller than a first threshold, acquire an average picture level of each frame of moving image obtained after the $(n-1)^{th}$ frame image is moved in a plurality of preset moving directions.

Specifically, when a difference between the average picture level of the $n^{th}$ frame image and an average picture level of an $(n-1)^{th}$ frame image is smaller than a first threshold, on one hand, this may be caused by a change in the image content of the $n^{th}$ frame image, but the difference between the average picture level of the two frame images is still within the preset first threshold since the changed image content is highly similar to the image content before the change. On the other hand, this may be caused by image movement of the $n^{th}$ frame image relative to the $(n-1)^{th}$ frame image, while the image content of the $n^{th}$ frame image is not changed. To further judge the cause for the image display brightness change of the $n^{th}$ frame image, an embodiment of the present disclosure introduces the average picture level of each frame of moving image obtained after the $(n-1)^{th}$ frame image is moved in a plurality of preset moving directions. First, an average picture level of each frame of moving image obtained after the $(n-1)^{th}$ frame image is moved in a plurality of possible preset moving directions is obtained. Then the average picture level of the $n^{th}$ frame image is compared with the average picture level of each frame of moving image obtained after the $(n-1)^{th}$ frame image is moved by one frame in the plurality of preset possible moving directions. Based on a comparison result, the cause for the image display brightness change of the $n^{th}$ frame image is determined. Then it is further determined whether the $n^{th}$ frame image is a static image or a dynamic image relative to the $(n-1)^{th}$ frame image, and the $n^{th}$ frame image data is processed accordingly.

In some embodiments, the first threshold may be determined according to the image resolution. A smaller first threshold may be set for a higher image resolution, and a larger first threshold may be set for a lower image resolution. Since image movement is characterized by moving a fixed region each time, assuming that the image movement employs a 1-pixel movement scheme, the threshold=(n/total number of display lines), where n represents the number of possible movement lines. For example, taking a full high definition (FHD) resolution, i.e., 1920*1080, as an example, when a film source reaches a 1080P resolution, i.e., a line resolution of 1080, assuming n=2 and the threshold=2/1080=0.19%, then the $n^{th}$ image is considered as a static image as long as the difference between the average brightness values of the two images is within 0.19%. Apparently, the first threshold may be set based on other factors.

It will be appreciated that the difference between the average picture level of the $n^{th}$ frame image and the average picture level of the $(n-1)^{th}$ frame image is a value greater than 0, and when the difference between the average picture level of the $n^{th}$ frame image and the average picture level of the $(n-1)^{th}$ frame image is 0, it indicates that the $n^{th}$ frame image and the $(n-1)^{th}$ frame image are identical, i.e., the $n^{th}$ frame image is changed in the image content or moved relative to the $(n-1)^{th}$ frame image. In this case, the $n^{th}$ frame image may be directly determined as a static image, and subjected to static image brightness reduction processing without further comparison with the average picture level of each moving image.

The adjustment unit 303 is configured to, in response to that the average picture level of the $n^{th}$ frame image is equal to the average picture level of frame of moving image, acquire an accumulated display time length of image content displayed by the $n^{th}$ frame image, and adjust brightness of the $n^{th}$ frame image according to the accumulated display time length.

Specifically, when the average picture level of the $n^{th}$ frame image is equal to the average picture level of any frame of moving image, it indicates that the cause for the image display brightness change of the $n^{th}$ frame image is image movement, and the $n^{th}$ frame image is a static image since the image content of the $n^{th}$ frame image is not changed relative to that of the $(n-1)^{th}$ frame image. Therefore, an accumulated display time length of image content displayed by the $n^{th}$ frame image is acquired, and brightness of the $n^{th}$ frame image is adjusted according to the accumulated display time length. In other words, static image brightness reduction processing is performed on the $n^{th}$ frame image according to the accumulated display time length. The accumulated display time length refers to an accumulated display time length of the same image content. If the image content of the $n^{th}$ frame image is the same as that of the $(n-1)^{th}$ frame image, the accumulated display time length of the $n^{th}$ frame image is further accumulated on the basis of the accumulated display time length of the $(n-1)^{th}$ frame image.

In an embodiment of the present disclosure, when a difference between the average picture level of the $n^{th}$ frame image and an average picture level of an $(n-1)^{th}$ frame image is smaller than or equal to a first threshold, it is further determined whether the difference between the average picture level of the $n^{th}$ frame image and the average picture level of the $(n-1)^{th}$ frame image is caused by moving the $(n-1)^{th}$ frame image to obtain the $n^{th}$ frame image, or by changing the image content of the $(n-1)^{th}$ frame image to obtain the $n^{th}$ frame image. In an embodiment of the present disclosure, the average picture level of the $n^{th}$ frame image is compared with an average picture level of each frame of moving image obtained after the $(n-1)^{th}$ frame image is moved in a plurality of preset moving directions. If the average picture level of the $n^{th}$ frame image is equal to the average picture level of any frame of moving image, it indicates that the $n^{th}$ frame image is obtained by moving the $(n-1)^{th}$ frame image, and the $n^{th}$ frame image is a static image, and therefore, the brightness of the $n^{th}$ frame image can be adjusted according to a static image brightness reduction algorithm. With the average picture level of each frame of moving image obtained after the $(n-1)^{th}$ frame image is moved in the plurality of preset moving directions, it can be more accurately determined whether the $n^{th}$ frame image is a static image or a dynamic image, and based on a determination result, the image data can be better processed, thereby avoiding the influence on the use experience of a user when the brightness is reduced due to misjudgment upon picture switching.

In some embodiments, in addition to the calculation unit 301, the acquisition unit 302, and the adjustment unit 303, the data processing apparatus further includes a control unit 304.

The control unit 304 is configured to, in response to that the average picture level of the $n^{th}$ frame image is not equal to the average picture level of any frame of moving image, output the $n^{th}$ frame image data for display, reset the accumulated display time length of the image content displayed by the $n^{th}$ frame image to zero, and restart timing.

The control unit 304 serves to output the image data for display. Specifically, the control unit 304 includes a processing module and a timing module, where the processing module is configured to output the image data for display, and the timing module is configured to calculate an accumulated display time length of the image content. When the average picture level of the $n^{th}$ frame image is not equal to the average picture level of any frame of moving image, it indicates that the $n^{th}$ frame image is not obtained by moving the $(n-1)^{th}$ frame image in a possible direction, but by changing the image content. That is, the image content of the $n^{th}$ frame image is changed relative to the image content of the $(n-1)^{th}$ frame image. Therefore, the $n^{th}$ frame image is a dynamic image relative to the $(n-1)^{th}$ frame image. In this case, the processing module of the control unit 304 directly outputs the received image data for display. In addition, since the accumulated display time length refers to an accumulated display time length of the same image content, when the image content of the $n^{th}$ frame image is changed relative to the image content of the $(n-1)^{th}$ frame image, the timing module of the control unit 304 needs to recount the accumulated display time length, and a display moment of the current $n^{th}$ frame image is an initial display moment. In other words, the accumulated time length of the image content displayed by the $n^{th}$ frame image is zero, and the display time length is re-accumulated.

In some embodiments, when the difference between the average picture level of the $n^{th}$ frame image and an average picture level of the $(n-1)^{th}$ frame image is smaller than or equal to the first threshold, the adjustment unit 303 firstly adjusts the image data, and then the processing module of the control unit 304 is configured to output the $n^{th}$ frame image data adjusted by the adjustment unit 303 for display, while the timing module of the control unit 304 continues to accumulate the accumulated display time length of the image content displayed by the $n^{th}$ frame image.

In some embodiments, the calculation unit 301 is further configured to determine the average picture level of any frame image according to a brightness value of each subpixel in a display panel. In addition to the calculation unit 301, the acquisition unit 302, the adjustment unit 303, and the control unit 304, the data processing apparatus further includes a determination unit 305. For the average picture level of the moving image, the determination unit 305 is configured to determine, according to a moving direction, a pixel vacancy region of the display panel relative to the moving image, and take a preset brightness value as the brightness value of each subpixel in the pixel vacancy region; and the calculation unit 301 is specifically configured to calculate an average picture level of the moving image based on a current brightness value of each subpixel in the display panel.

Specifically, when the image is moved, a corresponding pixel vacancy region will currently appear in the display panel, and before calculating the average picture level of the moving image, a preset brightness value is required to be used as the brightness value of each subpixel in the pixel vacancy region. That is, the pixel vacancy region is supplemented with preset pixel information. The preset brightness value is different from the brightness value of the corresponding region before the movement. For example, the preset brightness value may be 0, which means that the pixel vacancy region is supplemented with black pixels, or the brightness value may also be a value other than 0, which means that the pixel vacancy region is supplemented with other color pixels, such as red pixels or the like. The specific preset value may be set arbitrarily as long as the brightness value of the pixel vacancy region after the movement is distinguished from the brightness value of the corresponding region before the movement. The average picture level of the moving image is calculated on the basis of the entire display panel.

After the image is moved, some parts of the image on the display panel may be missing, resulting in inaccurate image data. Even if the pixel vacancy region is supplemented with the preset pixel information, the supplemented preset pixel information may be just the same as the average picture level in the image information before the movement, leading to a wrong final judgment result.

To make the acquired image data more accurate and obtain a more accurate judgment result, In some embodiments, the determination unit 305 is further configured to determine an image discrimination region based on maximum numbers of pixels that the $(n-1)^{th}$ frame image has moved in a horizontal direction and a vertical direction relative to each moving image of the $(n-1)^{th}$ frame image; and the calculation unit 301 is further configured to determine the average picture level of any frame image according to a brightness value of each subpixel in the image discrimination region.

Specifically, in the process of image movement, the image discrimination region will never be moved out of the display panel, that is, image missing will not occur in the image discrimination region. Therefore, the average picture level is calculated on the basis of the image discrimination region so that the image data is more accurate, and the final determination of the image direction is also more accurate.

In some embodiments, the determination unit 305 is specifically configured to determine the image discrimination region according to a horizontal resolution and a vertical resolution of the (n-1)$^{th}$ frame image, where a horizontal resolution of the image discrimination region=the horizontal resolution of the (n-1)$^{th}$ frame image-2*M; and a vertical resolution of the image discrimination region=the vertical resolution of the (n-1)$^{th}$ frame image-2*N; where M is a maximum number of pixels of the moving image moving in the horizontal direction, and N is a maximum number of pixels of the moving image moving in the vertical direction.

Figure 4:
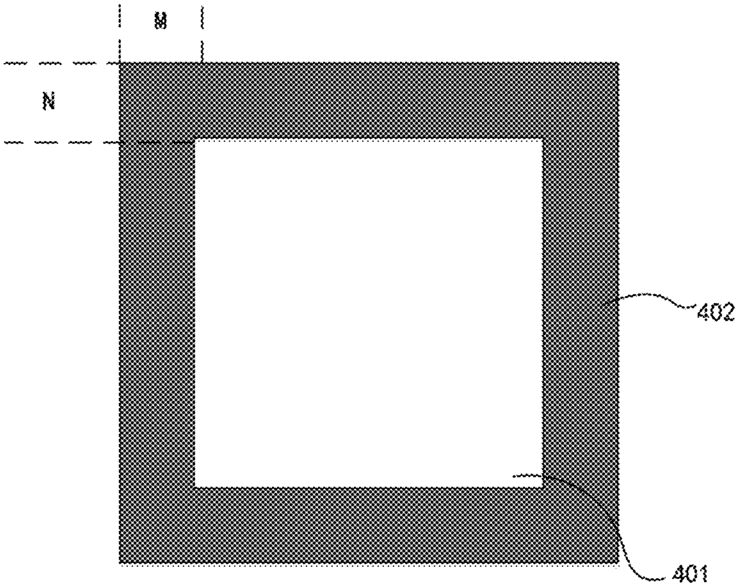
FIG. 4 is a schematic diagram of an image discrimination region according to an embodiment of the present disclosure.

FIG. 4 is a schematic diagram of an image discrimination region according to an embodiment of the present disclosure. As shown in FIG. 4, it is assumed that a maximum number of pixels of the moving image moving in the horizontal direction is M, and a maximum number of pixels of the moving image moving in the vertical direction is N. Movement to the left or to the right is possible in the horizontal direction, and similarly, movement upward or downward is possible in the vertical direction. Therefore, the final image discrimination region calculated is 401, and the hatched portion 402 is an invalid region.

In some embodiments, the calculation unit 301 is specifically configured to calculate the average picture level of any frame image according to an average picture level equation:

the average picture level=(Lr_sum+Lg_sum+Lb_sum+Lw_sum)/(Factor×Lmax_sum), where Lr_sum is a sum of red subpixels in a region to be calculated, Lg_sum is a sum of green subpixels in the region to be calculated, Lb_sum is a sum of blue subpixels in the region to be calculated, Lw_sum is a sum of white subpixels in the region to be calculated, Lmax_sum is a sum of all subpixels when the region to be calculated is fully bright, and Factor is a power consumption parameter, where the region to be calculated is the image discrimination region or an entire region of the display panel.

Specifically, in the OLED display, each pixel is composed of four subpixels, i.e., a red subpixel, a cyan subpixel, a blue subpixel, and a white subpixel. In a common display, however, each pixel includes only three subpixels, namely, a red subpixel, a cyan subpixel, and a blue subpixel. The OLED display, separate white display is replaced with the white subpixel, which can reduce the power consumption. Generally, only one or two of the white subpixel, the red subpixel, the green subpixel, or the blue subpixel are lighted in display instead of lighting all the four subpixels at the same time. Lr_sum, Lg_sum, Lb_sum, and Lw_sum represent the sums of various subpixels actually lit in display, and Lmax_sum is a sum of all subpixels in full brightness. For example, assuming that the gray scale of the current frame image is 1023, since a single pixel is composed of 4 subpixels, the sum of single pixels Lmax_sum is 1023×4. However, in actual display, each subpixel does not necessarily have the highest brightness, and as a result, the sum of all subpixels is actually less than Lmax_sum. Factor is a parameter representing the power consumption, and is generally set according to lighting conditions of the subpixels, and ranges from 1 to 4, typically 2.

In some embodiments, the adjustment unit 303 is specifically configured to judge whether the accumulated display time length is greater than or equal to a preset time length. If the accumulated display time length is greater than or equal to a preset time length, the adjustment unit 303 is further configured to adjust brightness of the n$^{th}$ frame image based on a brightness reduction curve.

In some embodiments, the brightness reduction curve is a linear function curve.

Figure 5:
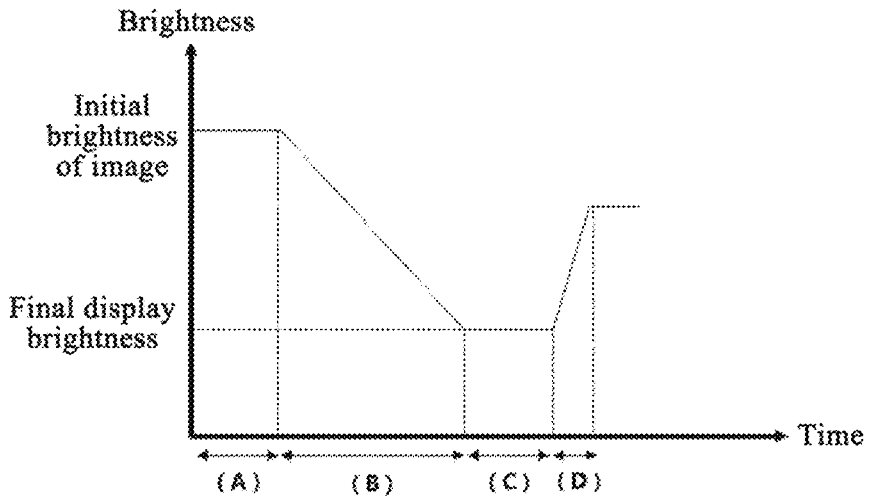
FIG. 5 is a schematic diagram illustrating changes in image display brightness with an accumulated display time length according to an embodiment of the present disclosure.

Specifically, the display brightness of the image is maintained at the initial time, and the processor continuously calculates the accumulated display time length of the picture. FIG. 5 is a schematic diagram illustrating changes in image display brightness with an accumulated display time length according to an embodiment of the present disclosure. As shown by the A period in FIG. 5, when the accumulated display time length exceeds a preset time length, for example, 60 seconds, the B period is entered for image brightness reduction. Generally, the brightness reduction curve is declined with time by a linear function. Some patents may use other curves for brightness reduction, until a final target display brightness is reached. Then the C period is entered, where the brightness is maintained. When the image content is changed, the D period is entered, where as the brightness rises to the initial brightness of the image over time, a new accumulated lighting time length is calculated. Through this method, a residual image in display caused by property changes of the light-emitting device or the TFT after the same high-brightness image is lit for a long time can be avoided.

In some embodiments, the adjustment unit 303 is specifically configured to adjust the brightness of the n$^{th}$ frame image to 60% of original brightness of the n$^{th}$ frame image based on the brightness reduction curve. Generally, it is sufficient to adjust the brightness of the n$^{th}$ frame image to 60% of the original brightness, which can avoid the problem of the residual image due to a too bright image, and avoid affecting the use experience of the user due to a too dark image. It will be appreciated that the adjusted brightness of the n$^{th}$ frame image may be set according to specific requirements, and may be in the range of 0 to an original brightness of the n$^{th}$ frame image, which is not limited in the embodiments of the present disclosure.

In some embodiments, in addition to the calculation unit 301, the acquisition unit 302, the adjustment unit 303, the control unit 304, and the determination unit 305, the data processing apparatus further includes a storage unit 306. The storage unit 306 is configured to store the average picture level of the n$^{th}$ frame image, and an average picture level of each frame of moving image obtained after the (n-1)$^{th}$ frame image is moved in a plurality of preset moving directions.

In some embodiments, the acquisition unit 301 in the data processing apparatus may calculate the average picture level of each frame of moving image obtained after the (n-1)$^{th}$ frame image is moved in the plurality of preset moving directions in advance and store the average picture level in the storage unit. When the average picture level data of each frame of moving image obtained after the (n-1)$^{th}$ frame image is moved in the plurality of preset moving directions is needed, the average picture level of each frame of moving image obtained after the (n-1)$^{th}$ frame image is moved in the plurality of preset moving directions may be directed read from the storage unit, which shortens the calculation process, reduces the calculation amount, and improves the data processing efficiency.

In some embodiments, the acquisition unit 301 is further configured to acquire the $(n-1)^{th}$ frame image data; and the calculation unit is further configured to calculate, based on the $(n-1)^{th}$ frame image data, an average picture level of each frame of moving image obtained after the $(n-1)^{th}$ frame image is moved in a plurality of preset moving directions. Specifically, the acquisition unit may first obtain the $(n-1)^{th}$ frame image data, and then the calculation unit calculates an average picture level of each frame of moving image obtained after the $(n-1)^{th}$ frame image is moved in a plurality of preset moving directions. This has the advantage that only when the difference between the average picture level of the $n^{th}$ frame image and the average picture level of an $(n-1)^{th}$ frame image is smaller than the first threshold, the calculation unit calculates the average picture level of each frame of moving image obtained after the $(n-1)^{th}$ frame image is moved in the plurality of preset moving directions, while when the difference between the average picture level of the $n^{th}$ frame image and an average picture level of the $(n-1)^{th}$ frame image is greater than or equal to the first threshold, calculation of the average picture level of the moving image is omitted. Compared with the case of calculating the average picture level of each frame of moving image obtained after the $(n-1)^{th}$ frame image is moved in the plurality of preset moving directions in advance and storing the average picture level in the storage unit, this method can save the storage space and improve the data processing efficiency.

In some embodiments, the determination unit 305 is further configured to determine the plurality of preset moving directions of the $(n-1)^{th}$ frame image based on a moving mode of the $(n-1)^{th}$ frame image, and when the moving mode of the $(n-1)^{th}$ frame image is rectangular image movement or diamond-shaped image movement, the determination unit 305 is configured to determine eight preset moving directions as the plurality of preset moving directions.

Specifically, during image movement, a position of the image is typically moved at fixed time to prevent the OLED from lighting with the same brightness for a long time. In different moving modes, the image may be moved in different directions. There are generally two moving modes: a rectangular moving mode and a diamond-shaped moving mode.

Figure 6:
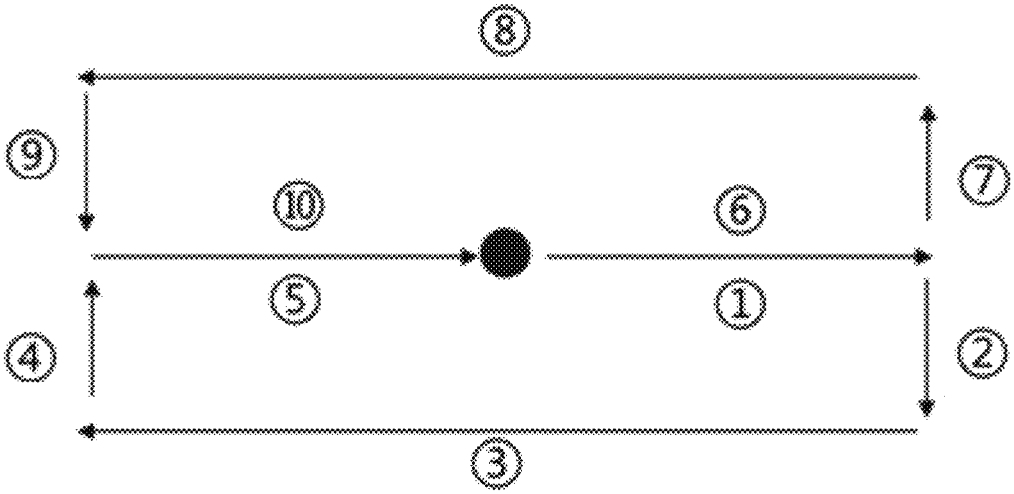
FIG. 6 is a schematic diagram illustrating a route in a rectangular moving mode according to an embodiment of the present disclosure.

In the rectangular moving mode, the image is moved in horizontal and vertical directions, and moved by 1 unit region at fixed time. FIG. 6 is a schematic diagram illustrating a route in a rectangular moving mode according to an embodiment of the present disclosure. As shown in FIG. 6, the image is moved according to the trajectory in FIG. 6 until returning to an origin, and then a new round of image movement starts. Taking FIG. 6 as an example, the black circle is the origin, and the image is moved along the trajectory to the right first, and then to the bottom sequentially before returning to the origin. It can be seen from the schematic diagram of the route in FIG. 6 that there are eight possible moving directions in the rectangular moving mode, i.e., ① or ⑥, ②, ③, ④, ⑤ or ⑩, ⑦, ⑧, and ⑨. Therefore, the acquisition unit 301 needs to acquire an average picture level of each frame of moving image obtained after the $(n-1)^{th}$ frame image is moved in the eight preset moving directions.

Figure 7:
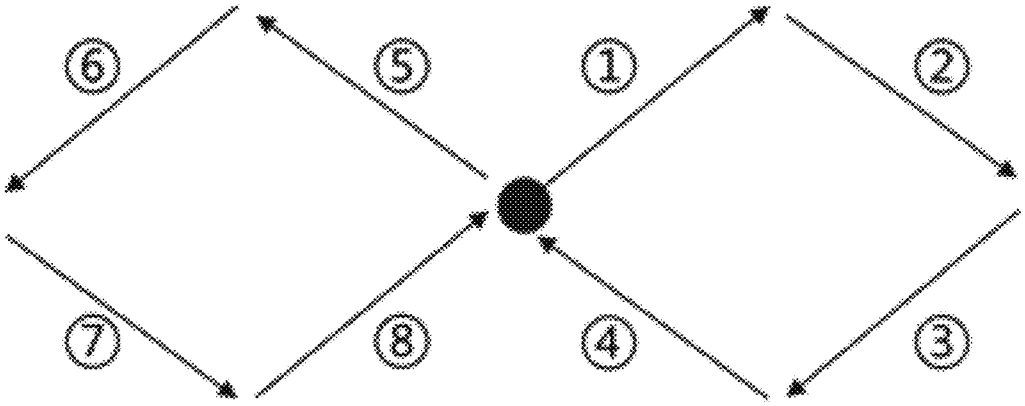
FIG. 7 is a schematic diagram illustrating a route in a diamond-shaped moving mode according to an embodiment of the present disclosure.

In the diamond-shaped image movement, the image is moved along a diamond-shaped oblique line, and moved by 1 unit region at fixed time. FIG. 7 is a schematic diagram illustrating a route in a diamond-shaped moving mode according to an embodiment of the present disclosure. As shown in FIG. 7, the image is moved according to the trajectory in FIG. 7 until returning to an origin, and then a new round of image movement starts. According to FIG. 7, the black circle is the origin, and the moving unit region is 1 pixel, and the image is moved along the trajectory to the upper right side for a distance, and then moved to the lower right side sequentially until returning to the origin. It can be seen from the schematic diagram of the route in FIG. 7 that there are eight possible moving directions in the diamond-shape moving mode, i.e., ①, ②, ③, ④, ⑤, ⑥, ⑦, and ⑧. Therefore, the acquisition unit 301 needs to acquire an average picture level of each frame of moving image obtained after the $(n-1)^{th}$ frame image is moved in the eight preset moving directions.

In addition to the rectangular moving mode or the diamond-shaped moving mode, the image moving mode may include other moving modes, and all possible moving directions of the image, i.e., all preset moving directions, are determined according to the specific moving mode.

Figure 8A:
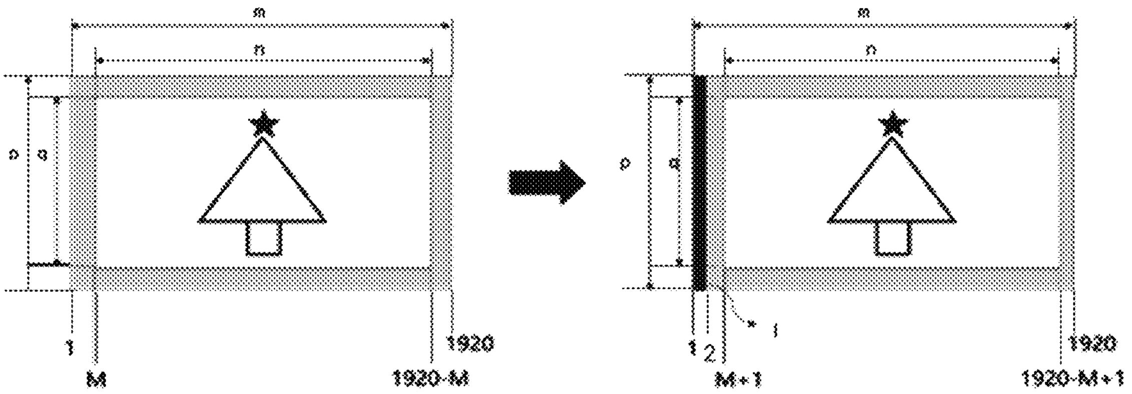
FIGS. 8A to 8B are schematic diagrams of pixel vacancy regions generated after an image is moved in a rectangular moving mode and in a diamond-shaped moving mode according to an embodiment of the present disclosure, respectively.
Figure 8B:
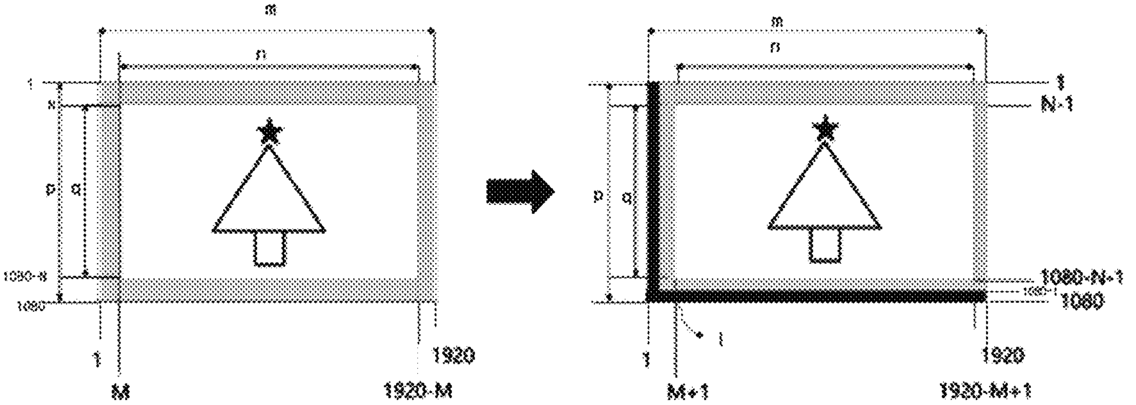

It will be appreciated that, according to different image moving modes, when the image is moved, different pixel vacancy regions will currently appear in the display panel correspondingly, and before calculating the average picture level of the moving image, a preset brightness value is required to be used as the brightness value of each subpixel in the pixel vacancy region. That is, different regions are supplemented with the preset pixel information. FIGS. 8A to 8B are schematic diagrams of pixel vacancy regions generated after an image is moved in a rectangular moving mode and in a diamond-shaped moving mode according to an embodiment of the present disclosure, respectively, and in the embodiment of the present disclosure, an image of full high-definition resolution is taken as an example for illustrate. As shown in FIGS. 8A to 8B, m represents an image horizontal resolution 1920, n represents a discrimination region horizontal resolution, p represents an image vertical resolution 1080, q represents a discrimination region vertical resolution, and l represents a region in the pixel vacancy region supplemented with preset pixel information, where black pixel information is taken as an example of the supplementary pixel information in the embodiment. In the rectangular moving mode, assuming that the unit of movement is 1 pixel each time, a next frame image is moved to the right, and schematic diagrams before and after the movement are obtained. As shown in FIG. 8A, the discrimination region horizontal resolution n before the movement is M to 1920-M, and a region 1 to 2 becomes a pixel vacancy region after the movement, which is supplemented with black pixel information. The discrimination region horizontal resolution after the movement is changed from M to M+1, and from 1920-M to 1920-M+1. That is, the discrimination region horizontal resolution n after the movement is M+1 to 1920-M+1. In the diamond-shaped moving mode, assuming that the unit of movement is 1 pixel each time, a next frame image is moved to the upper right, and schematic diagrams before and after the movement are obtained. As shown in FIG. 8B, when the image is moved to the upper right in the diamond-shaped mode, pixel vacancy regions are present in both the horizontal direction and the vertical direction. In the horizontal direction, the case is the same as that of FIG. 8A. In the vertical direction, the discrimination region horizontal resolution q before the movement is 1080-N to N, and a region 1080 to 1080-1 becomes a pixel vacancy region after the movement, which is supplemented with black pixel information. The discrimination region vertical resolution after the movement is changed from 1080-N to 1080-N−1, and from N to N−1. That is, the discrimination region vertical resolution q after the movement is 1080-N−1 to N−1.

According to the data processing apparatus provided in the embodiments of the present disclosure, when the difference between the average picture level of the $n^{th}$ frame image and the average picture level of the $(n-1)^{th}$ frame image is within a range of the first threshold, the adjustment unit 303 compares the average picture level of the $n^{th}$ frame image with an average picture level of each frame of moving image obtained after the $(n-1)^{th}$ frame image is moved in a plurality of preset moving directions, to accurately determine whether the difference is caused by image content change or image movement, and further, the control unit may perform different processing on the $n^{th}$ frame image data for display. Therefore, the displayed image has no parameter problem while satisfying the user experience. Further, the determination unit may determine an image discrimination region so that the calculation unit performs calculation on the basis of the image discrimination region when calculating the average picture level of each frame image, which enables more accurate judgment of a static or dynamic image.

Figure 9:
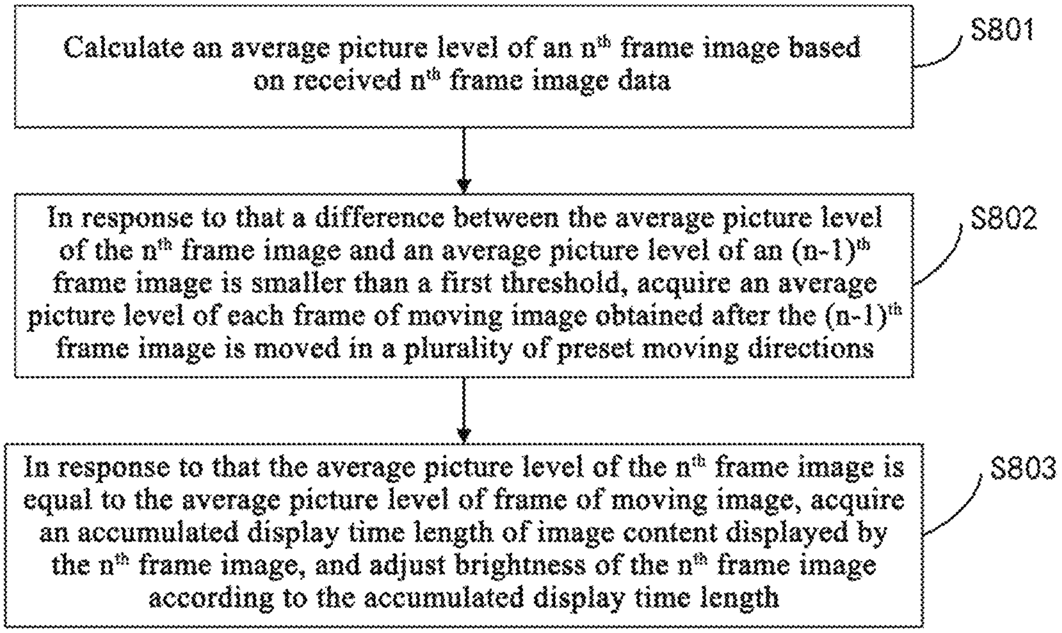
FIG. 9 is a flowchart of an image data processing method according to an embodiment the present disclosure.

FIG. 9 is a flowchart of an image data processing method according to an embodiment the present disclosure. This method may be applied to the image processing apparatus described above. As shown in FIG. 9, the method includes the following operations S801 to S803.

At S801: calculating an average picture level of an $n^{th}$ frame image based on received $n^{th}$ frame image data.

At S802: in response to that a difference between the average picture level of the $n^{th}$ frame image and an average picture level of an $(n-1)^{th}$ frame image is smaller than a first threshold, acquiring an average picture level of each frame of moving image obtained after the $(n-1)^{th}$ frame image is moved in a plurality of preset moving directions.

At S803: in response to that the average picture level of the $n^{th}$ frame image is equal to the average picture level of frame of moving image, acquiring an accumulated display time length of image content displayed by the $n^{th}$ frame image, and adjusting brightness of the $n^{th}$ frame image according to the accumulated display time length.

In some embodiments, the image data processing method further includes: in response to that the average picture level of the $n^{th}$ frame image is not equal to the average picture level of any frame of moving image, outputting the $n^{th}$ frame image data for display, resetting the accumulated display time length of the image content displayed by the $n^{th}$ frame image to zero, and restarting timing.

In some embodiments, before calculating the average picture level of the $n^{th}$ frame image based on the received $n^{th}$ frame image data, the method further includes: determining an image discrimination region based on maximum numbers of pixels that the $(n-1)^{th}$ frame image has moved in a horizontal direction and a vertical direction relative to each moving image of the $(n-1)^{th}$ frame image. In this method, the average picture level of any frame image is determined according to a brightness value of each subpixel in the image discrimination region.

In some embodiments, in this method, the average picture level of any frame image is determined according to a brightness value of each subpixel in a display panel. Calculating the average picture level of the moving image includes: determining, according to a moving direction, a pixel vacancy region of the display panel relative to the moving image, and taking a preset brightness value as the brightness value of each subpixel in the pixel vacancy region; and calculating an average picture level of the moving image based on a current brightness value of each subpixel in the display panel.

In some embodiments, in this method, the average picture level of any frame image is calculated by:

the average picture level=(Lr_sum+Lg_sum+Lb_sum+Lw_sum)/(Factor×Lmax_sum), where Lr_sum is a sum of red subpixels in a region to be calculated, Lg_sum is a sum of green subpixels in the region to be calculated, Lb_sum is a sum of blue subpixels in the region to be calculated, Lw_sum is a sum of white subpixels in the region to be calculated, Lmax_sum is a sum of all subpixels when the region to be calculated is fully bright, and Factor is a power consumption parameter, where the region to be calculated is the image discrimination region or an entire region of the display panel.

In some embodiments, determining the image discrimination region based on the maximum numbers of pixels that the $(n-1)^{th}$ frame image has moved in the horizontal direction and the vertical direction relative to each moving image of the $(n-1)^{th}$ frame image includes:

a horizontal resolution of the image discrimination region=the horizontal resolution of the $(n-1)^{th}$ frame image-2*M; and a vertical resolution of the image discrimination region=the vertical resolution of the $(n-1)^{th}$ frame image-2*N; where M is a maximum number of pixels of the moving image moving in the horizontal direction, and N is a maximum number of pixels of the moving image moving in the vertical direction.

In some embodiments, adjusting brightness of the $n^{th}$ frame image according to the accumulated display time length includes: judging whether the accumulated display time length is greater than or equal to a preset time length, and if the accumulated display time length is greater than or equal to the preset time length, adjusting brightness of the $n^{th}$ frame image based on a brightness reduction curve.

In some embodiments, the brightness reduction curve is a linear function curve.

In some embodiments, adjust brightness of the $n^{th}$ frame image based on the brightness reduction curve includes: adjusting the brightness of the $n^{th}$ frame image to 60% of original brightness of the $n^{th}$ frame image based on the brightness reduction curve.

In some embodiments, acquiring the average picture level of each frame of moving image obtained after the $(n-1)^{th}$ frame image is moved in the plurality of preset moving directions includes: acquiring the $(n-1)^{th}$ frame image data; and calculating, based on the $(n-1)^{th}$ frame image data, an average picture level of each frame of moving image obtained after the $(n-1)^{th}$ frame image is moved in a plurality of preset moving directions.

In some embodiments, the method further includes: determining the plurality of preset moving directions of the $(n-1)^{th}$ frame image based on a moving mode of the $(n-1)^{th}$ frame image, and when the moving mode of the $(n-1)^{th}$ frame image is rectangular image movement or diamond-shaped image movement, determining eight preset moving directions as the plurality of preset moving directions.

In some embodiments, the method further includes: storing the average picture level of the $n^{th}$ frame image and the average picture level of each frame of moving image obtained after the $(n-1)^{th}$ frame image is moved in the plurality of preset moving directions in a storage unit.

Figure 10:
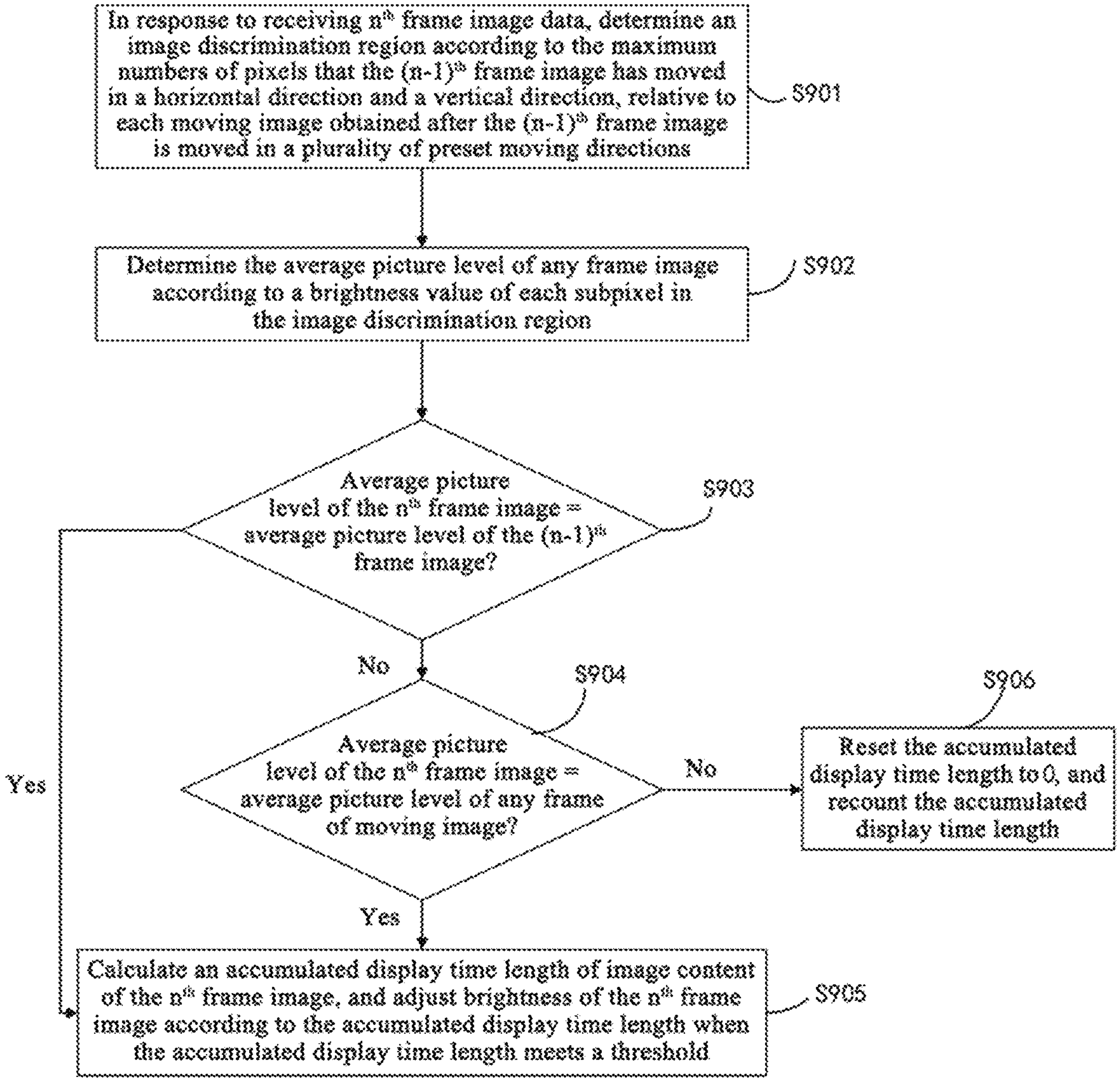
FIG. 10 is a flowchart of another image data processing method according to an embodiment the present disclosure.

FIG. 10 is a flowchart of another image data processing method according to an embodiment the present disclosure.

At S901: in response to receiving $n^{th}$ frame image data, determining an image discrimination region according to the maximum numbers of pixels that the $(n-1)^{th}$ frame image has moved in a horizontal direction and a vertical direction, relative to each moving image obtained after the $(n-1)^{th}$ frame image is moved in a plurality of preset moving directions.

At S902: determining the average picture level of any frame image according to a brightness value of each subpixel in the image discrimination region. The any frame includes an average picture level of the $n^{th}$ frame image, an average picture level of the $(n-1)^{th}$ frame image, and an average picture level of each frame of moving image obtained after the $(n-1)^{th}$ frame image is moved in the plurality of preset moving directions.

At S903: judging whether the average picture level of the $n^{th}$ frame image is equal to the average picture level of the $(n-1)^{th}$ frame image.

If the average picture level of the $n^{th}$ frame image is equal to the average picture level of the $(n-1)^{th}$ frame image, S905 is performed: calculating an accumulated display time length of image content of the $n^{th}$ frame image, and adjusting brightness of the $n^{th}$ frame image according to the accumulated display time length when the accumulated display time length meets a threshold.

If the average picture level of the $n^{th}$ frame image is not equal to the average picture level of the $(n-1)^{th}$ frame image, S904 is performed: judging whether the average picture level of the $n^{th}$ frame image is equal to the average picture level of any frame of moving image obtained after the $(n-1)^{th}$ frame image is moved in the plurality of preset moving directions.

If the average picture level of the $n^{th}$ frame image is equal to the average picture level of any frame of moving image obtained after the $(n-1)^{th}$ frame image is moved in the plurality of preset moving directions, S905 is performed.

If the average picture level of the $n^{th}$ frame image is not equal to the average picture level of any frame of moving image obtained after the $(n-1)^{th}$ frame image is moved in the plurality of preset moving directions, S906 is performed: resetting the accumulated display time length to 0, and recounting the accumulated display time length.

It should be noted that in the above embodiments of the image data processing method, details of specific embodiments are the same as those of the image processing apparatus, which are not described in detail here.

An embodiment of the present disclosure further provides a display panel, including any image data processing apparatus as described in the above embodiments. The display panel further includes a main controller, a source driver, a gate driver, and a display screen. A main system chip is typically used as the main controller for data processing and control. A data processing apparatus is typically used as a timing controller (TCON), and configured to drive a main system board of the display screen and process most algorithms of images in the display screen. The source driver and the gate driver are configured to drive source and gate pixels. The main controller provides image data to the data processing apparatus, the data processing apparatus performs corresponding image processing procedures to obtain data required by a driver by conversion, and the display screen displays images according to the required data.

It will be appreciated that the above implementations are merely exemplary implementations for the purpose of illustrating the principle of the present disclosure, and the present disclosure is not limited thereto. Various modifications and improvements can be made by a person having ordinary skill in the art without departing from the spirit and essence of the present disclosure. Accordingly, all of the modifications and improvements also fall into the protection scope of the present disclosure.

What is claimed is:

1. An image data processing apparatus, comprising:

a calculation unit configured to calculate an average picture level of an $n^{th}$ frame image based on received $n^{th}$ frame image data;

an acquisition unit configured to, in response to that a difference between the average picture level of the $n^{th}$ frame image and an average picture level of an $(n-1)^{th}$ frame image is smaller than or equal to a first threshold, acquire an average picture level of each frame of moving image obtained after the $(n-1)^{th}$ frame image is moved in a plurality of preset moving directions; and an adjustment unit configured to, in response to that the average picture level of the $n^{th}$ frame image is equal to the average picture level of any frame of moving image, acquire an accumulated display time length of image content displayed by the $n^{th}$ frame image, and adjust brightness of the $n^{th}$ frame image according to the accumulated display time length.

2. The apparatus according to claim 1, further comprising:

a control unit configured to, in response to that the average picture level of the $n^{th}$ frame image is not equal to the average picture level of any frame of moving image, output the $n^{th}$ frame image data for display, reset the accumulated display time length of the image content displayed by the $n^{th}$ frame image to zero, and restart timing.

3. The apparatus according to claim 1, further comprising:

a determination unit configured to determine an image discrimination region based on maximum numbers of pixels that the $(n-1)^{th}$ frame image has moved in a horizontal direction and a vertical direction relative to each moving image of the $(n-1)^{th}$ frame image;

wherein the calculation unit is further configured to determine the average picture level of any frame image according to a brightness value of each subpixel in the image discrimination region.

4. The apparatus according to claim 3, wherein the calculation unit is specifically configured to calculate the average picture level of any frame image according to an average picture level equation:

the average picture level=(Lr_sum+Lg_sum+Lb_sum+Lw_sum)/(Factor×Lmax_sum), wherein Lr_sum is a sum of red subpixels in a region to be calculated, Lg_sum is a sum of green subpixels in the region to be calculated, Lb_sum is a sum of blue subpixels in the region to be calculated, Lw_sum is a sum of white subpixels in the region to be calculated, Lmax_sum is a sum of all subpixels when the region to be calculated is fully bright, and Factor is a power consumption parameter, wherein the region to be calculated is the image discrimination region.

5. The apparatus according to claim 3, wherein the determination unit is specifically configured to determine the image discrimination region according to a horizontal resolution and a vertical resolution of the $(n-1)^{th}$ frame image, wherein a horizontal resolution of the image discrimination region=the horizontal resolution of the $(n-1)^{th}$ frame image-2*M; and a vertical resolution of the image discrimination region=the vertical resolution of the $(n-1)^{th}$ frame image-2*N; where M is a maximum number of pixels of the moving image moving in the horizontal direction, and N is a maximum number of pixels of the moving image moving in the vertical direction.

6. The apparatus according to claim 1, wherein the calculation unit is further configured to determine the average picture level of any frame image according to a brightness value of each subpixel in a display panel; the apparatus further comprises a determination unit, wherein for the average picture level of the moving image, the determination unit is configured to determine, according to a moving direction, a pixel vacancy region of the display panel relative to the moving image, and take a preset brightness value as the brightness value of each subpixel in the pixel vacancy region; and the calculation unit is configured to calculate an average picture level of the moving image based on a current brightness value of each subpixel in the display panel.

7. The apparatus according to claim 6, wherein the calculation unit is specifically configured to calculate the average picture level of any frame image according to an average picture level equation:

the average picture level=(Lr_sum+Lg_sum+Lb_sum+Lw_sum)/(Factor×Lmax_sum), wherein Lr_sum is a sum of red subpixels in a region to be calculated, Lg_sum is a sum of green subpixels in the region to be calculated, Lb_sum is a sum of blue subpixels in the region to be calculated, Lw_sum is a sum of white subpixels in the region to be calculated, Lmax_sum is a sum of all subpixels when the region to be calculated is fully bright, and Factor is a power consumption parameter, wherein the region to be calculated is an entire region of the display panel.

8. The apparatus according to claim 1, wherein the adjustment unit is specifically configured to judge whether the accumulated display time length is greater than or equal to a preset time length, if the accumulated display time length is greater than or equal to the preset time length, the adjustment unit is further configured to adjust brightness of the $n^{th}$ frame image based on a brightness reduction curve.

9. The apparatus according to claim 8, wherein the brightness reduction curve is a linear function curve.

10. The apparatus according to claim 8, wherein the adjustment unit is specifically configured to adjust the brightness of the $n^{th}$ frame image to 60% of original brightness of the $n^{th}$ frame image based on the brightness reduction curve.

11. The apparatus according to claim 1, wherein the acquisition unit is further configured to acquire $(n-1)^{th}$ frame image data; and the calculation unit is configured to calculate, based on the $(n-1)^{th}$ frame image data, the average picture level of each frame of moving image obtained after the $(n-1)^{th}$ frame image is moved in the plurality of preset moving directions.

12. The apparatus according to claim 11, further comprising: a storage unit configured to store the average picture level of the $n^{th}$ frame image, and the average picture level of each frame of moving image obtained after the $(n-1)^{th}$ frame image is moved in the plurality of preset moving directions.

13. The apparatus according to claim 1, wherein the determination unit is further configured to determine the plurality of preset moving directions of the $(n-1)^{th}$ frame image based on a moving mode of the $(n-1)^{th}$ frame image, and when the moving mode of the $(n-1)^{th}$ frame image is rectangular image movement or diamond-shaped image movement, the determination unit is configured to determine eight preset moving directions as the plurality of preset moving directions.

14. A display panel, comprising the image data processing apparatus according to claim 1.

15. An image data processing method, comprising:

calculating an average picture level of an $n^{th}$ frame image based on received $n^{th}$ frame image data;

in response to that a difference between the average picture level of the $n^{th}$ frame image and an average picture level of an $(n-1)^{th}$ frame image is smaller than or equal to a first threshold, acquiring an average picture level of each frame of moving image obtained after the $(n-1)^{th}$ frame image is moved in a plurality of preset moving directions; and in response to that the average picture level of the $n^{th}$ frame image is equal to the average picture level of any frame of moving image, acquiring an accumulated display time length of image content displayed by the $n^{th}$ frame image, and adjusting brightness of the $n^{th}$ frame image according to the accumulated display time length.

16. The method according to claim 15, further comprising:

in response to that the average picture level of the $n^{th}$ frame image is not equal to the average picture level of any frame of moving image, outputting the $n^{th}$ frame image data for display, resetting the accumulated display time length of the image content displayed by the $n^{th}$ frame image to zero, and restarting timing.

17. The method according to claim 15, wherein before calculating the average picture level of the $n^{th}$ frame image based on the received $n^{th}$ frame image data, the method further comprises:

determining an image discrimination region based on maximum numbers of pixels that the $(n-1)^{th}$ frame image has moved in a horizontal direction and a vertical direction relative to each moving image of the $(n-1)^{th}$ frame image;

wherein the average picture level of any frame image is determined according to a brightness value of each subpixel in the image discrimination region.

18. The method according to claim 17, wherein the average picture level of any frame image is calculated by:

the average picture level=(Lr_sum+Lg_sum+Lb_sum+Lw_sum)/(Factor×Lmax_sum), wherein Lr_sum is a sum of red subpixels in a region to be calculated, Lg_sum is a sum of green subpixels in the region to be calculated, Lb_sum is a sum of blue subpixels in the region to be calculated, Lw_sum is a sum of white subpixels in the region to be calculated, Lmax_sum is a sum of all subpixels when the region to be calculated is fully bright, and Factor is a power consumption parameter, wherein the region to be calculated is the image discrimination region.

19. The method according to claim 17, wherein determining the image discrimination region based on the maximum numbers of pixels that the $(n-1)^{th}$ frame image has moved in the horizontal direction and the vertical direction relative to each moving image of the $(n-1)^{th}$ frame image comprises:

a horizontal resolution of the image discrimination region=the horizontal resolution of the $(n-1)^{th}$ frame image-2*M; and a vertical resolution of the image discrimination region=the vertical resolution of the $(n-1)^{th}$ frame image-2*N; where M is a maximum number of pixels of the moving image moving in the horizontal direction, and N is a maximum number of pixels of the moving image moving in the vertical direction.

20. The method according to claim 15, wherein the average picture level of any frame image is determined according to a brightness value of each subpixel in a display panel; wherein calculating the average picture level of the moving image comprises:

determining, according to a moving direction, a pixel vacancy region of the display panel relative to the moving image, and taking a preset brightness value as the brightness value of each subpixel of the pixel vacancy region; and calculating an average picture level of the moving image based on a current brightness value of each subpixel in the display panel.

* * * * *